June 18, 1968
R. BELL
3,389,299
FLUORESCENT LIGHTING SYSTEM
Filed Nov. 7, 1966
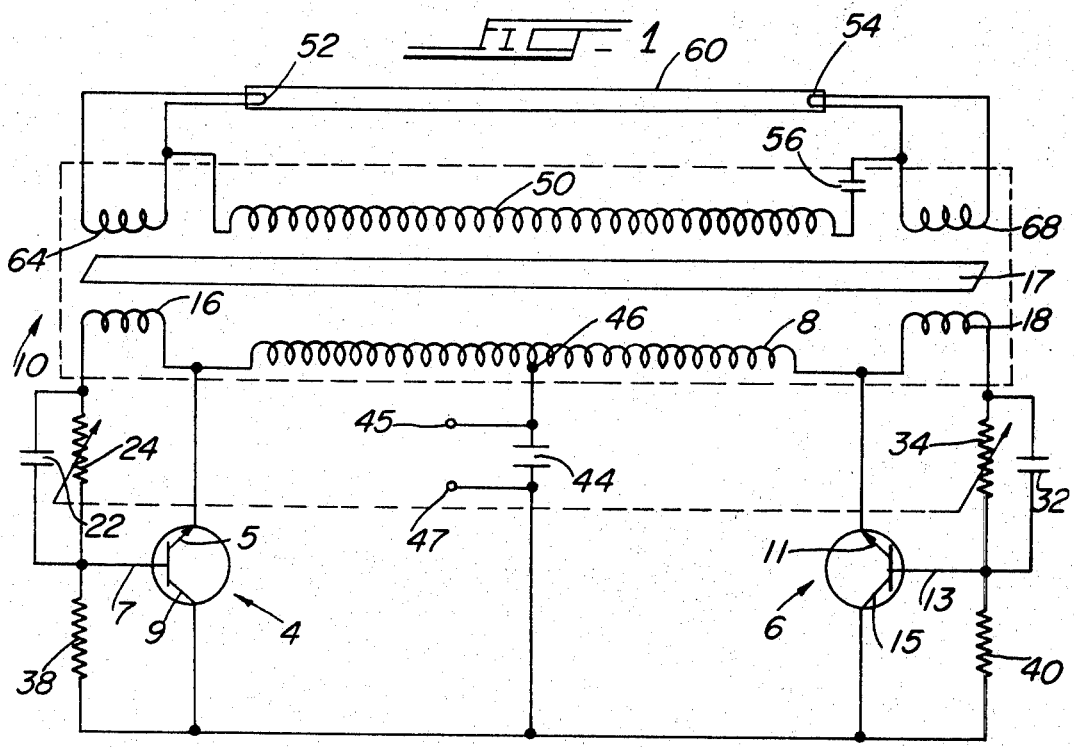
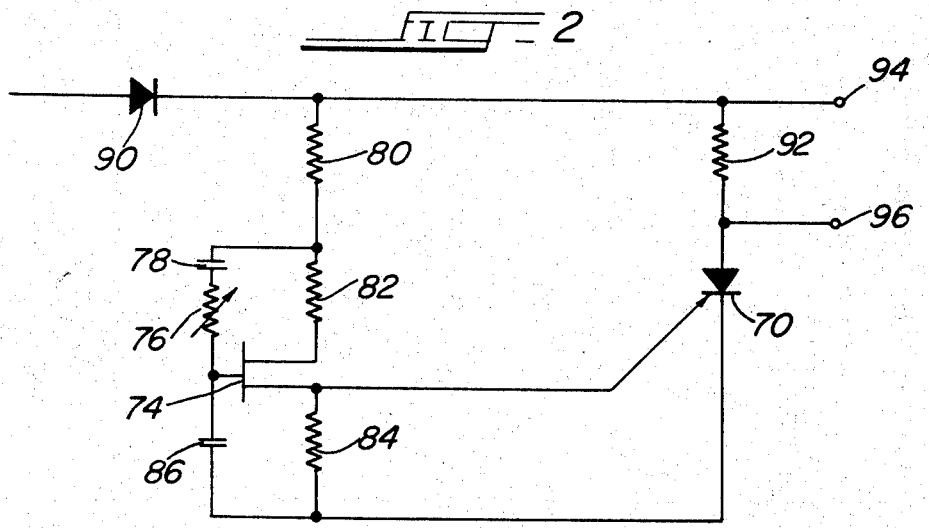
INVENTOR.
RONALD BELL
BY Kegan, Kegan & Berkman
ATTYS.

3,389,299
FLUORESCENT LIGHTING SYSTEM
Ronald Bell, Northridge, Calif., assignor, by mesne assignments, to Kegan, Kegan & Berkman, Chicago, Ill.
Filed Nov. 7, 1966, Ser. No. 592,527
8 Claims. (Cl. 315—206)

ABSTRACT OF THE DISCLOSURE

This invention relates generally to a fluorescent lighting system including an improved inverter circuit and a cooperating power supply operable on direct or alternating current. The inverter circuit utilizes a novel saturable magnetic core transformer with closely coupled windings.

---

It is the general object of this invention to provide an improved, relatively inexpensive fluorescent lighting system which provides a smoothly and continuously adjustable light intensity.

It is a further object of this invention to provide a fluorescent lighting system of improved efficiency, reduced generated noise, and reduced physical size, which system is capable of instant starting without the use of an external ballast.

It is another object of this invention to provide a fluorescent lighting system which is operable on low voltage direct current or alternating current.

A related object of the invention is to provide a power supply specially adapted for use in cooperation with the inverter circuit of the invention and facilitating use of the inverter with conventional 115 v. service.

These and other objects, advantages, and features of this invention will become apparent from the following description taken in conjunction with the accompanying drawings and claims.

Referring to the drawing:

FIGURE 1 is a circuit diagram of a transistor inverter and fluorescent lamp embodying the principles of the invention; and FIGURE 2 is a circuit diagram of a controlled rectifier power supply used in conjunction with the inverter.

Referring now to FIGURE 1, the present invention is shown, for the purpose of illustrative disclosure and not by way of limitation, as including a pair of transistors 4 and 6 connected through their collectors 9 and 15. The emitters 5 and 11 of transistors 4 and 6 are connected through the primary winding 8 of a transformer 10 wound on a saturable magnetic core 17, and secondary windings 16 and 18 of the transformer, which are closely coupled to the primary winding 8, are connected to opposite ends of the primary winding 8. A capacitor 22 and a variable resistor 24 are connected in parallel between the outer end of the secondary winding 16 and the base 7 of one transistor 4. Similarly, a capacitor 32 and a variable resistor 34 are connected in parallel between the outer end of the secondary winding 18 and the base 13 of the other transistor 6. A resistor 38 is connected between the base 7 and the collector 9 of transistor 4. Similarly, a resistor 40 is connected between the base 13 and the collector 15 of transistor 6, and an electrolytic capacitor 44 interconnects a center-tap 46 of the primary transformer winding 8 and the collectors 9 and 15 of the transistors 4 and 6. Any convenient source of direct current is applied at terminals 45 and 47 across the electrolytic capacitor 44, as described more fully hereinbelow. An additional secondary winding 50 of transformer 10 is connected at one end to one electrode 52 of a fluorescent lamp 60. At its other end, the secondary winding 50 is connected, through a capacitor 56, to a corresponding opposite electrode 54 of the same fluorescent lamp 60. Finally, two additional secondary windings 64 and 68 serve to supply filament current to the heaters at opposite ends of fluorescent lamp 60.

The operation of the particular exemplary circuit shown in FIGURE 1 is as follows:

A source of direct current comprising either a battery or a rectifier power supply is applied at terminals 45 and 47. The resulting bias voltage between the bases 7 and 13 and collectors 9 and 15 of the transistors 4 and 6 is determined by the values of the resistors 38 and 40, and causes initiation of current flow in the emitter to collector circuit of transistor 4. As this current flows through the primary winding 8 of the transformer 10 corresponding voltages are induced in the secondary windings 16 and 18, these voltages being effective to switch transistors 4 and 6 alternately on and off. As voltage is induced in the secondary winding 16 or 18, the corresponding transistor begins to conduct. As the resulting current saturates the transformer core, the voltage drops, causing one transistor to stop conducting as the other transistor begins to conduct. Thus, transistors 4 and 6 act as alternating switches, conducting current through the primary winding 8 at a frequency determined by the volt-second integral of the saturable magnetic transformer core.

The frequency of oscillation is independent of the load, being determined by such parameters as core dimensions, saturation flux density, and excitation terms. The frequency is related to these factors by the Faraday equation for square waves: $f = E \times 10^{-8}/4\ BAN$, where $f$ is the frequency, $E$ is the applied voltage, $B$ is the saturation flux density, $A$ is the core across sectional area, and $N$ is the number of turns.

The primary and secondary windings are closely coupled allowing for a slight amount of leakage inductance to insure reliable lamp starting. Of the five secondary windings, windings 16 and 18 supply feed-back current to maintain oscillation; the principal secondary winding 50 supplies high voltage to the fluorescent lamp 60 through capacitor 56 which limits current to prevent the negative resistance characteristic of the fluorescent lamp 50 from damaging the transistors 4 and 6. Windings 64 and 68 supply low voltage heater current to the filaments 52 and 54 of the lamp 60.

Variable resistors 24 and 34 are ganged to operate in unison, acting to limit current to the transistor bases 7 and 13 thus limiting the output supplied to the lamp 60. By adjusting the ganged variable resistors 24 and 34, the lamp current and resulting light intensity can be smoothly and easily adjusted. Capacitors 22 and 32 facilitate high frequency switching of the transistors and reduce circuit losses.

In the particular embodiment of the invention illustrated in FIGURE 1, the operating frequency is between 10 and 20 kilocycles. The direct current potential applied between terminals 45 and 47 is preferably in the range of 6 to 50 volts. The transformer 10 is wound on a core 11 having a saturation flux density of 2700 gauss and a cross sectional area of 0.6 square centimeter.

The transformer windings are as follows:

Primary winding 8—two windings of twelve turns No. 16 AWG bifilar wound.

Secondary windings 16 and 18—each four turns No. 20 AWG.

Secondary winding 50—168 turns No. 20 AWG.

Secondary windings 64 and 68—each three turns No. 20 AWG.

Referring to FIGURE 1, the component types and their values are as follows:

| | |
|---|---|
| Transistors 4 and 6 | RCA 2 N 3055 |
| Variable resistors 24 and 34 _____ohms__ | 27 to 270 |
| Capacitors 22 and 32 _____microfarad__ | 0.5 |
| Resistors 38 and 40 _____ohms__ | 680 |
| Capacitor 44 _____microfarads__ | 150 |
| Capacitor 56 _____microfarad__ | .01 |

Referring now to FIGURE 2 there is shown, for the purpose of illustrative disclosure, a regulated rectifier power supply suitable for supplying direct current for the operation of the circuit shown in FIGURE 1 from conventional alternating current power lines. As illustrated in FIGURE 2, a silicon controlled rectifier 70 is regulated by a unijunction transistor 74 which is controlled by the R-C networks comprising resistors 80 and 82, variable resistor 76 and capacitor 78 on one side and resistor 84 and capacitor 86 on the other side. A diode 90 rectifies incoming current for operation of the entire system. The resulting regulated direct current is made available across a load resistor 92 at terminals 94 and 96 which are connected to the power input terminals 45 and 47 of FIGURE 1.

The types and values of the components illustrated in FIGURE 2 are as follows:

| | |
|---|---|
| Silicon controlled rectifier 70 | TA 2686 |
| Unijunction transistor 74 | 2N2646 |
| Variable resistor 76 _____ohms__ | 100,000 |
| Capacitor 78 _____microfarad__ | .5 |
| Resistor 80 _____ohms__ | 3.3K |
| Resistor 82 _____ohms__ | 330 |
| Resistor 84 _____ohms__ | 100 |
| Capacitor 86 _____microfarads__ | 1 |
| Diode 90 | 1N247 |
| Resistor 92 _____ohms__ | 10,000 |

It must be recognized that the specific circuits described herein are merely preferred embodiments of the invention and that the invention is not limited to the particular parameters and circuit elements set forth in this disclosure. The appended claims are intended to cover appropriate modifications included within the spirit and scope of the invention.

What is claimed is:

1. A fluorescent lighting system comprising, in combination with a fluorescent lamp, an inverter comprising:
   a pair of transistors, each transistor of said pair having an emitter, a collector and a base;
   a transformer having a saturable magnetic core and a center-tapped primary winding;
   said center tapped primary winding being connected between the emitters of said pair of transistors;
   first and second closely coupled secondary windings on said transformer;
   a pair of resistors, each resistor of said pair being connected between the base and collector of a corresponding one of said transistors;
   a pair of variable resistors ganged to operate in unison and comprising means to control the intensity of said fluorescent lamp;
   each resistor of said pair of variable resistors being connected between one end of each of said first and second closely coupled secondary windings and the base of a corresponding one of said transistors;
   each of said first and second closely coupled secondary windings being connected at its other end to the emitter of a corresponding one of said transistors;
   a third closely coupled secondary winding on said transformer;
   a capacitor connected in series with said third closely coupled secondary winding and in circuit with said fluorescent lamp;
   fourth and fifth closely coupled secondary windings on said transformer;
   said fourth and fifth closely coupled secondary windings being connected to provide heater current to said fluorescent lamp; and
   a source of direct current;
   one side of said source of direct current being connected to the center-tap of said primary winding;
   the other side of said source of direct current being connected to the collectors of both transistors of said pair of transistors.

2. The invention set forth in claim 1 and further comprising means for facilitating high frequency switching and for reducing circuit losses,
   said means comprising a pair of capacitors, each capacitor of said pair being connected in parallel with a corresponding variable resistor of said pair of variable resistors.

3. The invention set forth in claim 1 wherein said source of direct current is a battery.

4. The invention set forth in claim 1 wherein said source of direct current is a rectifier power supply.

5. The invention set forth in claim 1 wherein said source of direct current is a rectifier power supply comprising a silicon controlled rectifier and a unijunction transistor.

6. The invention set forth in claim 2 wherein said source of direct current is a battery.

7. The invention set forth in claim 2 wherein said source of direct current is a rectifier power supply.

8. The invention set forth in claim 2 wherein said source of direct current is a rectifier power supply comprising a silicon controlled rectifier and a unijunction transistor.

References Cited

UNITED STATES PATENTS

| | | | |
|---|---|---|---|
| 2,964,676 | 12/1960 | Davies et al. | 315—98 |
| 3,159,799 | 12/1964 | Cooper | 331—112 |
| 3,210,654 | 10/1965 | Biderman et al. | 324—47 |
| 3,247,422 | 4/1966 | Schultz | 315—206 |
| 3,247,466 | 4/1966 | Mayer | 331—52 |
| 3,275,884 | 9/1966 | Segall et al. | 315—163 |
| 3,130,347 | 4/1964 | Harpley | 315—98 |

JOHN W. HUCKERT, *Primary Examiner.*

J. R. SHEWMAKER, *Assistant Examiner.*